Figure 1:
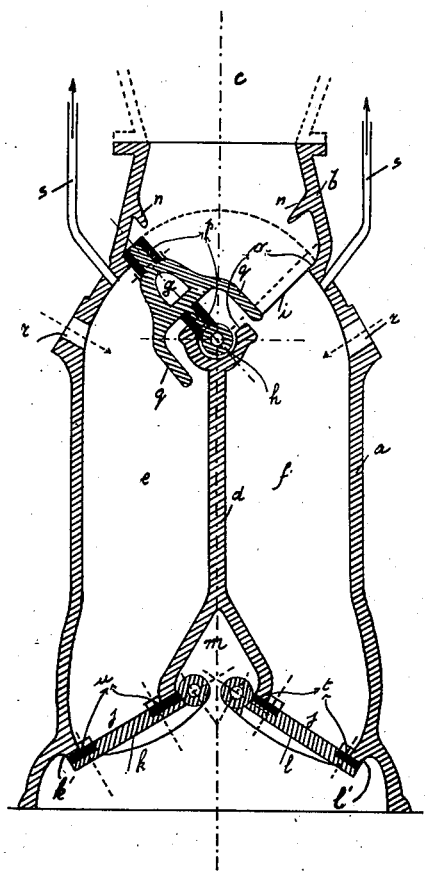

Feb. 8, 1927.

A. FRANCE

MINERAL CONCENTRATING PLANT

Filed Sept. 26, 1923    2 Sheets-Sheet 1

1,616,791

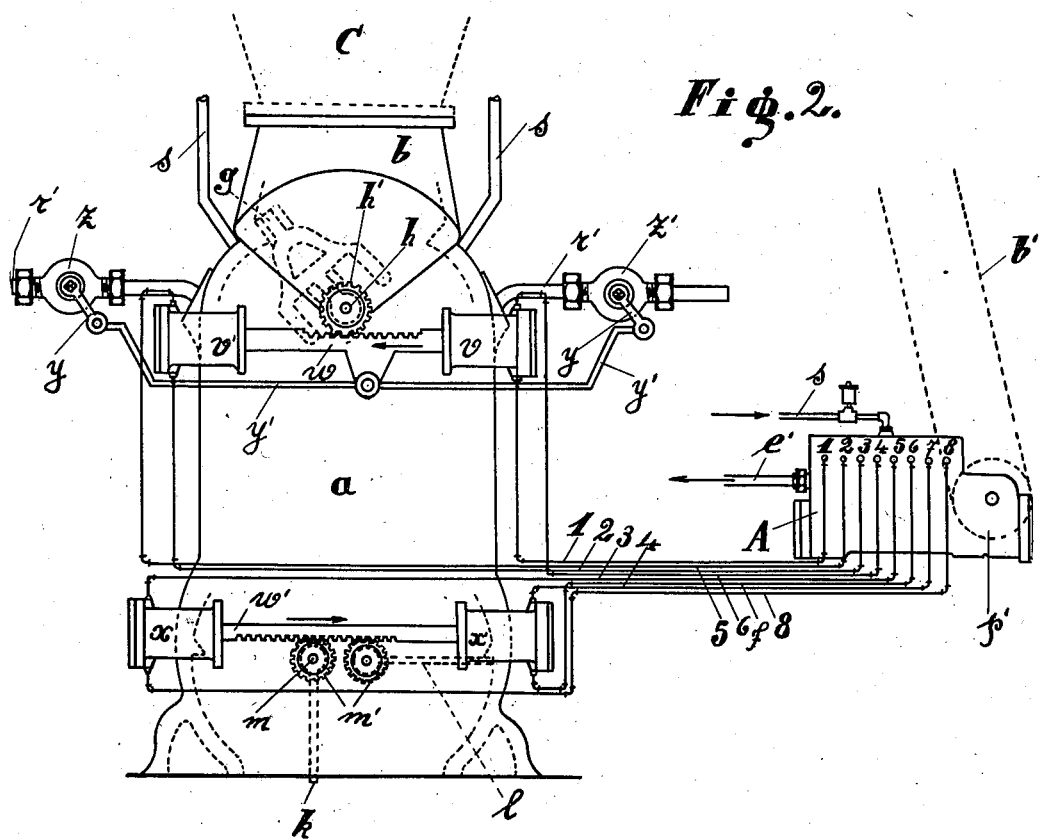

Patented Feb. 8, 1927.

1,616,791

UNITED STATES PATENT OFFICE.

ANTOINE FRANCE, OF LIEGE, BELGIUM.

MINERAL CONCENTRATING PLANT.

Application filed September 26, 1923, Serial No. 664,983, and in Belgium March 14, 1923.

The present invention relates to improvements in mineral concentrating plant, and more particularly to a novel apparatus for controlling the discharge of the products of highest specific gravity eliminated by the separators of plant for the concentration of minerals, chiefly coal, based on the separation of the latter according to specific gravity by means of a liquid conveying stream in a launder and upward streams in separators depending from and communicating with said launder, the provision of the said discharge-controlling apparatus having for its main object to enable the discharge of the aforesaid products from the separators to take place without creating disturbances in the operation of the liquid streams in the separators and launder. The said discharge-controlling apparatus essentially comprises two juxtaposed compartments, adjacent or otherwise conveniently disposed, which are, after having previously been filled with liquid, alternately put into communication with the discharge orifice at the base of the corresponding separator.

Each of the said compartments has an admission mouth at its upper end and a discharge mouth at its lower end. The two admission mouths are controlled by means of a single pivoted reversible distributing flap, while the discharge mouths are each controlled by an independent discharge valve. A suitable conveniently actuated mechanism ensures the operation in appropriate relation to each other and in proper sequence of the aforesaid flap and valves and also of a liquid-distributing device, in such a manner that the shutting-off of any one of the two admission mouths by the reversible distributing flap after the corresponding compartment has been filled will be followed by the opening of the discharge valve of the said compartment for the purpose of emptying the latter while at the same time the discharge valve of the adjacent compartment will be opened. Simultaneously with the shutting off of the admission mouth of the first-named compartment, the aforesaid liquid distributing device will act to cut-off the supply of liquid to such compartment and to cause liquid to be admitted into the other compartment. This mechanism may be of any type suitable for the purpose and operated in any convenient manner, the particular construction thereof forming no part of the present invention.

In order that the invention may be more readily understood one embodiment of same is, by way of example only, illustrated by the accompanying drawing, wherein Fig. 1 represents a vertical section through a discharge-controlling apparatus in accordance with the invention, while Fig. 2 is a diagrammatic illustration of the said apparatus together with a pneumatic mechanism for operating the various movable parts thereof.

Referring now to Fig. 1, the discharge-controlling apparatus according to the invention comprises a cast metal casing $a$ which has its upper portion formed as a neck $b$ placed immediately under and connecting with the discharge orifice or aperture $c$ at the base of the corresponding separator of the concentrating plant. A vertical partition $d$ divides the casing $a$ into two equal compartments $e$ and $f$. A suitably shaped reversible distributing flap $g$ mounted on a pivot pin $h$ extending along the upper end of the partition $d$ is capable, according to the position in which it is placed, of shutting-off the upper opening or admission mouth $i$ of one or the other of the compartments $e$, $f$, while the lower openings or discharge mouths $j$ of the said compartments may be closed by means of discharge valves $k$ and $l$ respectively mounted on pivot pins $m$ extending along the edges of the bifurcated lower portion of the partition $d$. The drawing shows the compartment $f$ in communication with the base $c$ of the separator, the compartment $e$ having its admission mouth shut off by the reversible distributing flap $g$. The operation of the apparatus will be readily understood. The products from the separator sink owing to their gravity into the compartment $f$, thus expelling the liquid contained therein towards the separator. These products are when sinking suitably directed owing to the shape of the walls and to the provision of projecting lips such as $n$, in order to avoid soiling or clogging the seat $o$ formed for the flap $g$ around the admission mouth $i$ of each of the compartments $e$ and $f$. When the compartment $f$ is filled, the reversible distributing flap $g$ changes position under the action of the operating device to which reference has been made above and which may be operated either mechanically, electrically, pneumatically or hydraulically, the said flap thus shutting-off the admission mouth $i$ of the compartment $f$ and opening that of the compartment $e$. The reversible distributing flap $g$ is provided with a fluid-tight packing $p$ adapted to bear on the seats $o$ in order to obtain a perfect separation of the compartments, and the said flap is moreover provided with integral extensions or guiding lips $q$ serving both to protect the portion of the seats $o$ constituted by the upper end of the partition $b$ and to guide the products towards that of the two admission mouths $i$ which is open for the corresponding position of the flap $g$.

Soon after the shutting-off of the admission mouth $i$ of the compartment $f$ by the reversible distributing flap $g$, the above mentioned operating mechanism causes the opening of the discharge valve $l$ thus allowing the products contained in the compartment $f$ to leave same via the corresponding discharge mouth $j$ for subsequent utilization. The liquid filling the spaces between the particles of the said products also leaves the compartment, thus facilitating the traveling along of the products. The compartment $e$ having meanwhile been filled with products, the discharge valve $l$ of the said compartment $f$ is closed again and soon thereafter the flap $g$ is reversed again by the operating mechanism thus shutting off the admission mouth of the compartment $e$ which has in the meantime been filled, a liquid distributing device (not shown in Fig. 1) also controlled by the said mechanism, is brought into action to fill the said compartment $f$ again with liquid via the inlet $r$ provided in the wall of the casing $a$. This liquid, when admitted in the said compartment expels the air contained therein via the air-vent $s$ provided for the purpose and which also serves as an overflow leading to the separator, for any excess of liquid which might be allowed into the compartment $f$. On liquid being thus admitted into the latter, the supply of liquid to the compartment $e$ via the inlet $r$ is shut off. Soon after the reversal of the flap $g$ causing the admission to the compartment $e$ to be cut-off, the operating mechanism acts to cause the discharge valve $k$ to be opened, thus allowing the compartment $e$ to be emptied in turn and starting the repetition, as far as the compartment $e$ is concerned of the same cycle of operations as those which have been described above as following the opening of the discharge valve $l$ of the compartment $f$.

The operating mechanism which controls the operation of the flap $g$ and the discharge valves $k$, $l$ as well as that of the liquid distributing device is designed in such a manner as to impart to the said discharge valves $k$ and $l$ when they are closed a suitable pressure against their seats $t$, so as to secure complete fluid-tightness by means of the fluid tight packing $u$ with which such valves $k$ and $l$ are provided.

Fig. 2 shows by way of example an embodiment wherein the various movable parts are controlled by a pneumatic operating mechanism actuated by compressed air, i. e. by air under pressure. According to the said Fig. 2, the mechanism for operating the reversible flap $g$ comprises two opposed cylinders $v$ and $v'$ arranged horizontally in alinement, with two plungers or pistons having a common piston rod formed as a rack $w$ which meshes with a toothed pinion $h'$ fixed on the pivot pin $h$ of the flap $g$, so that the movement of the rack will cause the rotation of the said pivot pin $h$ and consequently a change of position of the flap $g$. Similarly the mechanism for operating the discharge valves $k$ and $l$ comprises a rack $w'$ which forms a common piston rod for the two pistons of two opposed cylinders $x$ and $x'$ arranged horizontally in alinement. The said rack $w'$ is in mesh with two toothed pinions $m'$ secured on the pivot pins $m$ of the valves $k$ and $l$ in such a manner that when one of such valves is in the open position the other is in the closed position. The water or other liquid used is supplied to the two compartments $e$ and $f$ by means of supply-pipes $r'$ leading to the inlets $r$ (Fig. 1) and on which are placed two cocks $z$ and $z'$ by means of which the supply may be controlled. The operating arms $y$ of these cocks are at their free ends pivotally connected to one of the ends of connecting rods $y'$ of which the other ends are both pivoted to a central lug formed integrally on the rack $w$, so that the movement of the latter will also change the position of the cocks $z$ and $z'$. The rotatable plugs of these cocks are so positioned that when both arms $y$ have the same direction the passage through the plug of one cock will be in alinement with the longitudinal axis of said cock while the passage through the plug of the other cock will be positioned transversely to the longitudinal axis of such other cock, so that a single movement of the rack $w$ will simultaneously shut-off one cock and open the other. A indicates a compressed air distributor, of any suitable type or construction, which operates to admit air under pressure in the proper sequence to the cylinders $v$, $v'$, $x$ and $x'$ by way of the compressed air admission pipes 1, 2, 3 and 4, the said distributor being driven at a suitable speed from any convenient source of power by means of a pulley $p'$ and belt $b'$. 6, 5, 8 and 7 indicate the exhaust pipes from the cylinders, $v$, $v'$, $x$ and $x'$ respectively to the distributor A, and $e'$ is the general exhaust of the said distributor, to which air under pressure is supplied by means of the general supply pipe $s'$.

As it is essential to an efficient operation of the apparatus that the shutting of the discharge mouth of each compartment will take place a little before the opening of the admission mouth of such compartment, and that the opening of the discharge mouth of each compartment will take place only a little after the shutting of the admission mouth of such compartment, when the apparatus is completed by an operating mechanism of the type shown in Fig. 2, the sides of the seats $t$ of the valves $k$ and $l$ adjacent (when the valves are closed) the free edge of said valves parallel to their pivotal axes are provided with an integral segment-shaped seat-extension $k'$ and $l'$ respectively. The curve of these seat extensions is described from the same centre as that of the pivot of the corresponding flap, and as a result each valve has to effect a portion of its opening movement before it actually opens the discharge mouth controlled thereby, and each valve obturates the discharge mouth controlled thereby before having completed its closing movement. The relative initial positions of the two valves $k$ and $l$ being taken into account the length of the seat extensions $k'$ and $l'$, measured along the curve, is determined in such a manner that each of said valves on being opened will leave the adjacent seat extension only some time after the other valve, which is simultaneously being closed, has reached the corresponding seat extension. There is thus between the first portion of the joint movement of the two valves, during which one of such valves actually closes the discharge mouth which it controls, and the last portion of that movement, during which the other discharge valve actually opens the discharge mouth which it controls, an intermediate portion of the said movement during which both discharge mouths are obturated simultaneously.

The operation of the above described mechanism is the following:

Assuming that the parts are in the position shown in dotted lines in Fig. 2, that is to say in the position which they occupy when the right hand compartment ($f$, Fig. 1) is being filled, as soon as the said compartment is completely full, the distributor operates to allow the admission of air under pressure into the cylinder $x$ by way of the pipe 3, thus causing the piston of the said cylinder and the rack $w'$ to move in the direction indicated by the arrow, and causing the pistons of the cylinder $x'$ to expel the air still contained in the last named cylinder by way of the exhaust pipe 7. By this movement of the rack $w'$, the valve $k$ is closed and the valve $l$ is opened to allow of the right hand compartment being emptied.

When the rack $w'$ has effected a portion of its movement a little greater than that necessary to cause the valve $k$ to reach the end of the seat extension $k'$, the distributor acts to cause air to be admitted to the cylinder $v$ via the pipe 1, whereby the rack $w$ moves in the direction indicated by the arrow on the one hand, causing the air still contained in the cylinder $v'$ to be expelled via the pipe 5, and on the other hand causing the pinion $h$ to be rotated and the flap $g$ to be reversed, and the arrangement is such that the rack $w$ will have completed its movement just a little before the rack $w'$ has effected a portion of its movement sufficient to cause the valve $l$ to leave the seat extension $l'$, so that the flap $g$ opens the admission mouth of the left-hand compartment only a little after the valve $k'$ has shut off the discharge mouth thereof, and closes the admission mouth of the right-hand compartment a little before the flap $l$ starts opening the discharge mouth of the last named compartment. Simultaneously with the movement of the rack $w$ in the direction indicated by the arrow the cock $z$ is opened and the cock $z'$ is closed through the medium of the connecting rods $y'$. The flap $g$ is then in position to allow filling of the left-hand compartment ($e$, Fig. 1), of which the bottom is closed by the valve $k$. By the time the said left-hand compartment is entirely filled, the distributor operates to admit air under pressure into the cylinder $x'$ via the pipe 4, whereby the piston of this cylinder causes the rack $w'$ to move in a direction opposed to that indicated by the arrow and compels the piston of the cylinder $x$ to expel the air still contained in the last-named cylinder into the exhaust pipe 8. By this last movement of the rack $w'$, the valves $k$ and $l$ are caused to return to the position shown in dotted lines in Fig. 2.

In the meantime, the distributor has caused air to be admitted into the cylinder $v'$ via the pipe 2, whereby the rack $w$ is moved in a direction opposed to that indicated by the arrow, causing on the one hand the air contained in the cylinder $v$ to be expelled via the pipe 6 and on the other hand the flap $g$ and the cocks $z$ and $z'$ to return to the position shown in Fig. 2, this reversal of the flap $g$ taking place, as explained before, a little after the rack $w'$ has caused the valve $k$ to reach the end of the seat extension $k'$ and being completed a little before the said rack $w'$ causes the valve $l$ to leave the seat extension $l'$. As soon as the rack $w'$ has entirely completed its movement, all the parts thus again occupy the position shown in Fig. 2, wherein the flap $g$ permits filling of the right hand compartment ($f$, Fig. 1), of which the bottom is closed by the valve $l$, while the valve $k$ is open to allow of the left hand compartment being emptied.

I claim:

1. In apparatus for controlling the discharge of the products of highest specific gravity eliminated by the separators of plant for separating minerals according to specific gravity by means of a liquid conveying stream in a launder and upward streams in separators depending from and communicating with said launder, the combination of: a cast metal casing having its upper portion formed as a neck fitting and adapted to connect with the base of the liquid-stream separator; an integral vertical partition dividing said casing into two equal compartments having each an admission mouth at their upper end and a discharge mouth at their lower end; a single reversible distributing flap pivoted to the upper end of said partition and capable of shutting off the admission mouth of each compartment alternately while directing the products into the admission mouth of the other compartment, said admission mouths being formed as a seat for the said flap; a pair of discharge valves pivoted to the lower end of the aforesaid partition and each forming in its closed position a bottom for one of the compartments, the discharge mouth of said compartments being formed as a seat for said valves; a liquid inlet in the upper portion of the outer wall of each compartment; and an air-vent connected to each compartment above said liquid inlet; all substantially as described.

2. In apparatus for controlling the discharge of the products of highest specific gravity eliminated by the separators of plant for separating minerals according to specific gravity by means of a liquid conveying stream in a launder and upward streams in separators depending from and communicating with said launder, the combination of: a cast metal casing having its upper portion formed as a neck fitting and adapted to connect with the base of the liquid-stream separator; an integral vertical partition dividing said casing into two equal compartments having each an admission mouth at their upper end and a discharge mouth at their lower end; a single reversible distributing flap pivoted to the upper end of said partition and capable of shutting off the admission mouth of each compartment alternately; a seat for said flap formed round each admission mouth and adapted to keep such flap at a suitable downward inclination towards the upper end of the partition; integral guiding means on said distributing flap for directing, on such flap shutting off the admission mouth of either compartment, the products towards the admission mouth of the other compartment; a pair of discharge valves pivoted to the lower end of the aforesaid partition and each forming in its closed position a bottom for one of the compartments, the discharge mouth of said compartments being formed as a seat for said valves; a liquid inlet in the upper portion of the outer wall of each compartment; and an air vent connected to each compartment above said liquid inlet.

In testimony whereof I signed hereunto my name.

ANTOINE FRANCE.